Dec. 30, 1941.                G. J. GRANGE, SR                    2,268,071
                                 BAIT BUCKET
                              Filed Nov. 22, 1940              2 Sheets-Sheet 1

Inventor
George J. Grange Sr.

By Clarence A. O'Brien

Attorney

Dec. 30, 1941.  G. J. GRANGE, SR  2,268,071
BAIT BUCKET
Filed Nov. 22, 1940  2 Sheets-Sheet 2

Inventor
George J. Grange Sr.
By Clarence A. O'Brien
Attorney

Patented Dec. 30, 1941

2,268,071

UNITED STATES PATENT OFFICE 2,268,071

BAIT BUCKET

George J. Grange, Sr., North Little Rock, Ark.

Application November 22, 1940, Serial No. 366,733

1 Claim. (Cl. 43—56)

My invention relates to improvements in bait buckets for carrying live bait and more particularly minnows.

The invention is designed with the particular purpose in view of providing a simply constructed, inexpensive, fisherman's bait bucket for transporting minnows, particularly, by automobile, between fishing locations, and which is adapted for easy attachment to the front bumper of the automobile and for aerating water therein under travel of the automobile to thereby maintain the bait alive for a considerable length of time.

To the accomplishment of the above, and the subordinate objects presently appearing, a preferred embodiment of my invention has been illustrated in the accompanying drawings, set forth in detail in the succeeding description and defined in the claim appended hereto.

Figure 1:
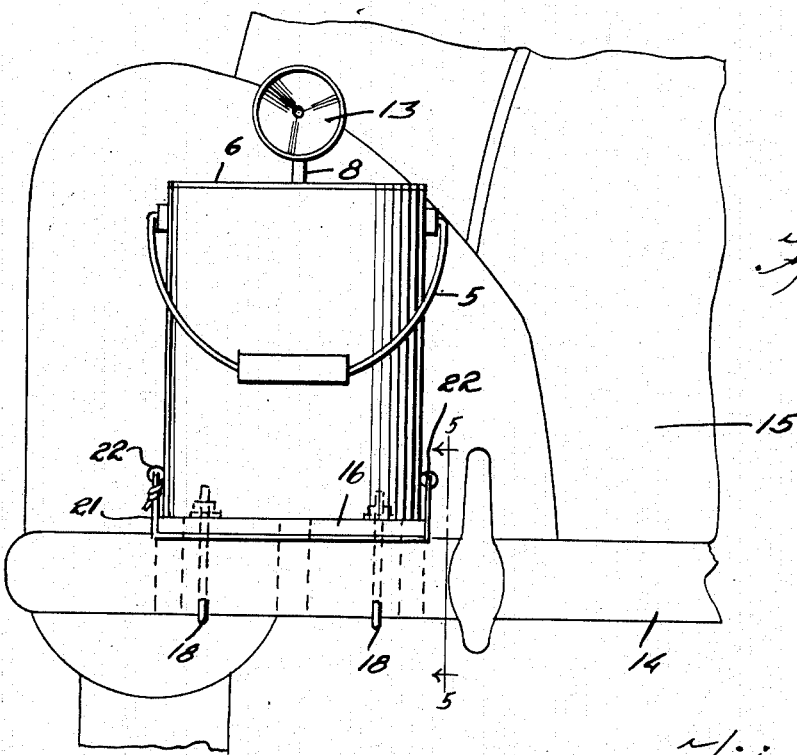
Figure 1 is a view in front elevation of the preferred embodiment of my invention attached to the front bumper of an automobile.
Figure 2:
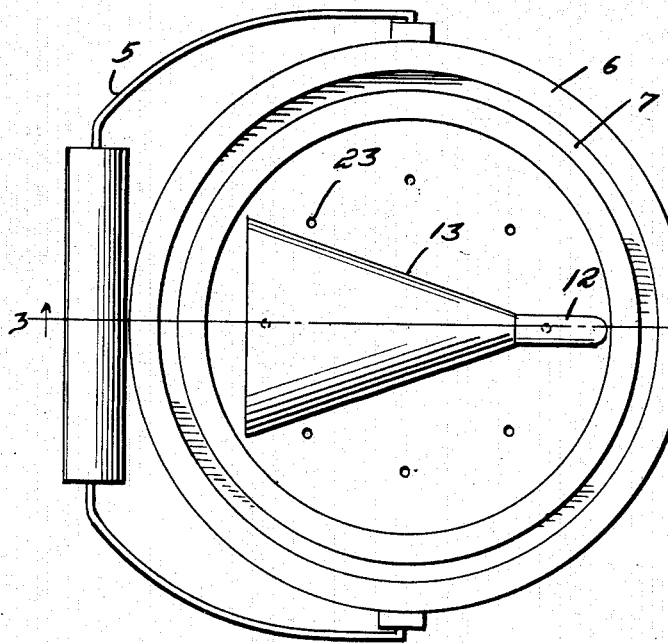
Figure 2 is a view in top plan drawn to an enlarged scale.
Figure 5:
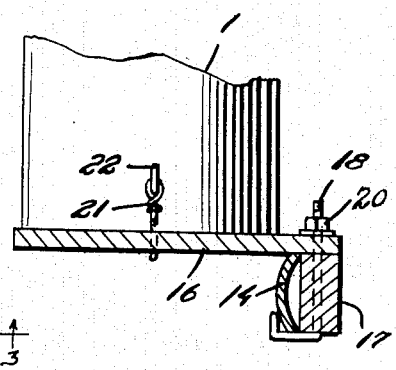
Figure 5 is a fragmentary view in vertical section taken on the line 5—5 of Figure 1.
Figure 3:
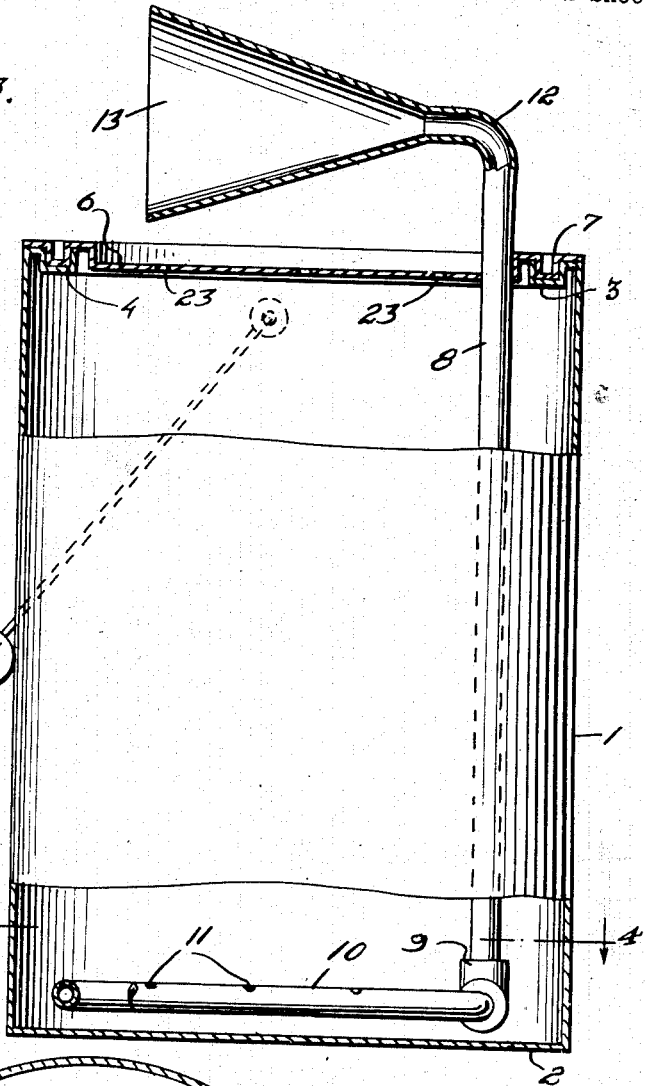
Figure 3 is a view in vertical section taken on the line 3—3 of Figure 2.
Figure 4:
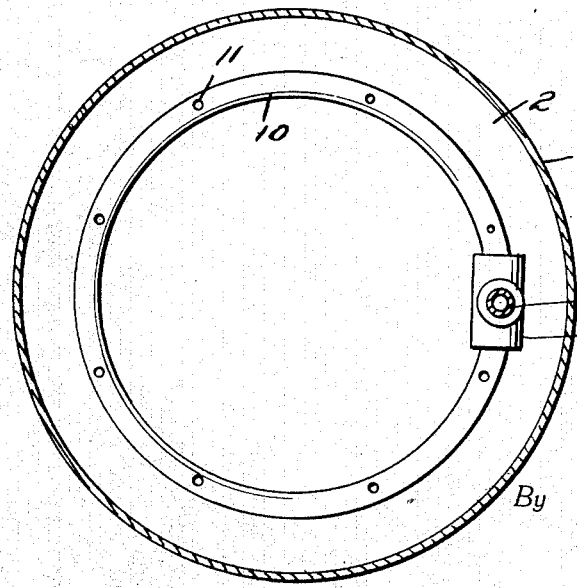
Figure 4 is a view in transverse section taken on the line 4—4 of Figure 3.

Referring to the drawings by numerals, in the illustrated embodiment thereof, my invention comprises a preferably cylindrical container 1 for water having a flat bottom 2, an internal flange 3 around its upper edge provided with the usual annular sealing channel 4 therein, and the usual form of carrying bail 5. A disk type cover 6 is provided for closing the top of the container 1, said cover having the usual annular sealing bead 7 on the under side thereof frictionally fitting in the channel 4.

Adjacent one side thereof, the cover 6 is apertured for the extension therethrough of an inlet pipe 8 for air, suitably fixed in said cover to depend into the container 1 and terminating in a T-fitting 9 adjacent the bottom of the container. A circular air discharge pipe 10 is suitably secured at its opposite ends in opposite ends of the fitting 9 to extend laterally from the pipe 8 over the bottom of the container parallel therewith and preferably concentrically thereof. Circumferentially spaced air discharge ports 11 are provided in the top of the pipe 10. The upper end of the inlet pipe 8 extends for a suitable distance above the cover 6 and terminates in an elbow 12 forming part of a funnel-shaped air scoop 13 disposed lengthwise across the cover 6.

Means are provided for detachably attaching the container 1 to the front bumper 14 of an automobile 15 comprising a platform support 16 adapted to be secured on top of the bumper 14 to extend forwardly therefrom and provided with a depending rear edge cleat 17 fitting against the rear side of the bumper 14. L-shaped bolts 18 extended through the support 16 and cleat 17 to hook over the lower edge of the bumper 14, and having nuts 19 thereon provide for detachably securing the support to said bumper.

A wire retainer 21 is extended under the support 16 with its ends trained upwardly upon opposite sides of said support and secured to eyelets 22 provided in opposite sides of the container 1, said retainer detachably securing the container on the support with the air scoop opening forwardly as regards the automobile.

A suitable number of air outlet ports 23 are provided in the cover 6.

As will be obvious, with the container 1 attached to the bumper 14 in the manner described, under forward travel of the automobile 15, air is forced into the scoop 13 and from the latter into the water in the container 1 by way of air inlet pipe 8 and air discharge pipe 10 so that the oxygen removed from the water by the minnows is replaced by aeration of the water. The ports 23 provide for the escape from the container 1 and the water of excess air pressure. By detaching the wire retainer 21 from the eyelets 22 the container 1 may be freed for carrying by hand through the medium of the bail 5. The bail 5 is of the requisite size to span the scoop 13 while the container 1 is being carried thereby.

The foregoing will, it is believed, suffice to impart a clear understanding of my invention without further explanation.

Manifestly the invention, as described, is susceptible of modification without departing from the scope of the inventive concept, and right is herein reserved to such modifications as fall within the scope of the subjoined claim.

What I claim is:

A bait bucket comprising a container for water, a perforated cover for said container, an air inlet pipe extending downwardly through said cover into said container at one side thereof, a perforated circular air discharge pipe extending laterally from the lower end of the air inlet pipe over the bottom of the container in centered relation to the latter, an air scoop extending laterally from the upper end of said inlet pipe over said cover and opening toward the opposite side of the container.

GEORGE J. GRANGE, Sr.